United States Patent [19]

Riley

[11] 3,875,427
[45] Apr. 1, 1975

[54] SWEEP GENERATOR CIRCUIT FOR AN ELECTRONIC APPARATUS WHICH PRODUCES A SWEEP SIGNAL HAVING A SWEEP RATE PROGRAMMED BY THE SETTINGS OF A SELECTED PLURALITY OF CONTROLS OF THE ELECTRONIC APPARATUS

[75] Inventor: Russell B. Riley, Portola Valley, Calif.

[73] Assignee: Hewlett-Packard Company, Palo Alto, Calif.

[22] Filed: Dec. 10, 1973

[21] Appl. No.: 423,341

[52] U.S. Cl................ 307/228, 307/229, 307/230, 328/181, 328/185, 328/145
[51] Int. Cl. .......................... H03k 4/08, G06g 7/24
[58] Field of Search................... 307/228, 229, 230; 328/181–185, 144, 145

[56] References Cited
UNITED STATES PATENTS

| | | | |
|---|---|---|---|
| 3,439,187 | 4/1969 | Strauss | 307/229 |
| 3,521,082 | 7/1970 | Wolk | 307/228 |
| 3,588,530 | 6/1971 | Langan | 307/229 |
| 3,612,902 | 10/1971 | Moose | 307/229 |

OTHER PUBLICATIONS

"Inverse Function D → A Converter," by Baumann in IBM Tech. Discl. Bull., Vol. 12, No. 1, June 1969, page 82.

*Primary Examiner*—Stanley D. Miller, Jr.
*Attorney, Agent, or Firm*—Patrick J. Barrett

[57] ABSTRACT

Several current sources are provided which produce currents proportional to the logarithms of IF bandwidth, video bandwidth, and scan width of a spectrum analyzer. These currents are summed by an operational amplifier to produce a voltage proportional to the algebraic sum of these currents. This voltage is applied to an exponentiating transistor to produce a collector current which charges a capacitor whose voltage rise is linear with time. The voltage on the capacitor may be used as a sweep signal in a spectrum analyzer. Other circuits generate compensating voltages which are added to the aforementioned voltage applied to the exponentiating transistor to reduce variations in collector current due to temperature changes in this transistor.

8 Claims, 2 Drawing Figures

SWEEP GENERATOR CIRCUIT FOR AN ELECTRONIC APPARATUS WHICH PRODUCES A SWEEP SIGNAL HAVING A SWEEP RATE PROGRAMMED BY THE SETTINGS OF A SELECTED PLURALITY OF CONTROLS OF THE ELECTRONIC APPARATUS

BACKGROUND OF THE INVENTION

Prior art sweep generators for spectrum analyzers usually provide a sweep rate which is controlled by a single switch with which the user manually selects the desired sweep rate. Ideally, the user will always want to select a sweep rate that is fast enough for the signal trace on the cathode ray tube display to appear flicker-free. Such a selection is usually possible with wide IF bandwidths and a narrow scan or sweep width; however, most users also desire to use narrow bandwidths and wide sweep widths to obtain greater resolution over a large portion of the spectrum. Under these conditions, the sweep rate must be reduced to give the IF filters sufficient time to respond to incoming signals. If the spectrum analyzer is swept too fast, the information displayed on the CRT will be distorted.

In many prior art spectrum analyzers, the operator must simply be alert to the possibility that decreasing IF bandwidth or increasing sweep width may result in an uncalibrated and distorted display. Thus, the operator will watch the display and change the sweep rate, or scan time, when the display starts to distort. Some spectrum analyzers, for example the Hewlett-Packard model 8553/8552, provide a warning light to indicate that the sweep rate is too great for the bandwidth and sweep width that have been selected. This warning light is connected to a sensing circuit that detects the positions of the various switches used to select the sweep width, sweep rate and bandwidth. The switch positions are detected by connecting each switch to a variable current source whose output is dependent on the setting of the switch. Since the proper relationship of bandwidth, sweep width and sweep rate can be expressed as an algebraic formula (discussed below) the currents representing these quantities are algebraically combined in the sensing circuitry to indicate whether the switch settings are proper.

Both of the foregoing methods have certain inhereint disadvantages. For the first method to be successful, the spectrum analyzer user must be aware of the effect described and he must constantly be alert to the effect of switch settings on the calibration of the display. This is frequently difficult, especially when the signal being detected is intermittent or the user is still looking for a signal. The second method is more desirable, but still requires vigilance on the part of the user, as well as an awareness of the significance of the warning light.

SUMMARY OF THE INVENTION

According to the preferred embodiment of the present invention, the sweep rate of a spectrum analyzer is automatically controlled by a simple control circuit which is dependent on the IF bandwidth ($BW_{IF}$), the video bandwidth ($BW_{vid}$), and the scan width (SW) of the analyzer. The relationship of these quantities to sweep rate (SR) or sweep time (ST) is given by the following equation:

$$SR = \frac{1}{ST} \leq \frac{BW_{IF} \times BW_{vid}}{1.5 \, SW}.$$

which may be expressed in logarithmic form as: $\log BW_{IF} + \log BW_{vid} - \log SW + K \geq \log (1/ST)$.

A $BW_{IF}$ control selects an IF bandwidth and also regulates a current source which provides a current proportional to $\log BW_{IF}$. In the same manner, a $BW_{vid}$ control selects a video bandwidth and also regulates a current source which provides a current proportional to $\log BW_{vid}$, and similarly, a SW control selects a scan width and at the same time regulates a current source to provide a current which is proportional to $-\log SW$. All of these currents are coupled to the spectrum analyzer sweep generator circuitry.

The three sources producing these currents are connected to a summing point which is, in turn, connected to the input of a summing amplifier. The output voltage of the summing amplifier is applied to the emitter-base junction of an exponentiating transistor to produce a collector current which is proportional to the anti-logarithm of the applied voltage, according to the well-known diode law. The collector current produced by the exponentiating transistor charges a capacitor to produce a voltage ramp which rises as a linear function of time. A reset circuit connected to the capacitor stops the voltage rise at a predetermined value and resets it to its initial value for the beginning of a new sweep. The output of this amplifier is used to control the sweep of a local oscillator and the horizontal deflection of a CRT in a spectrum analyzer.

Further, in accordance with the preferred embodiment of the present invention, circuits may also be included to effectively prevent temperature variations from changing the collector current produced by the exponentiating transistor. This stabilizing effect may be attained by adding compensating voltages to the voltage applied to the emitter-base junction of this transistor.

DESCRIPTION OF THE PREFERRED EMBODIMENT

Figure 1:
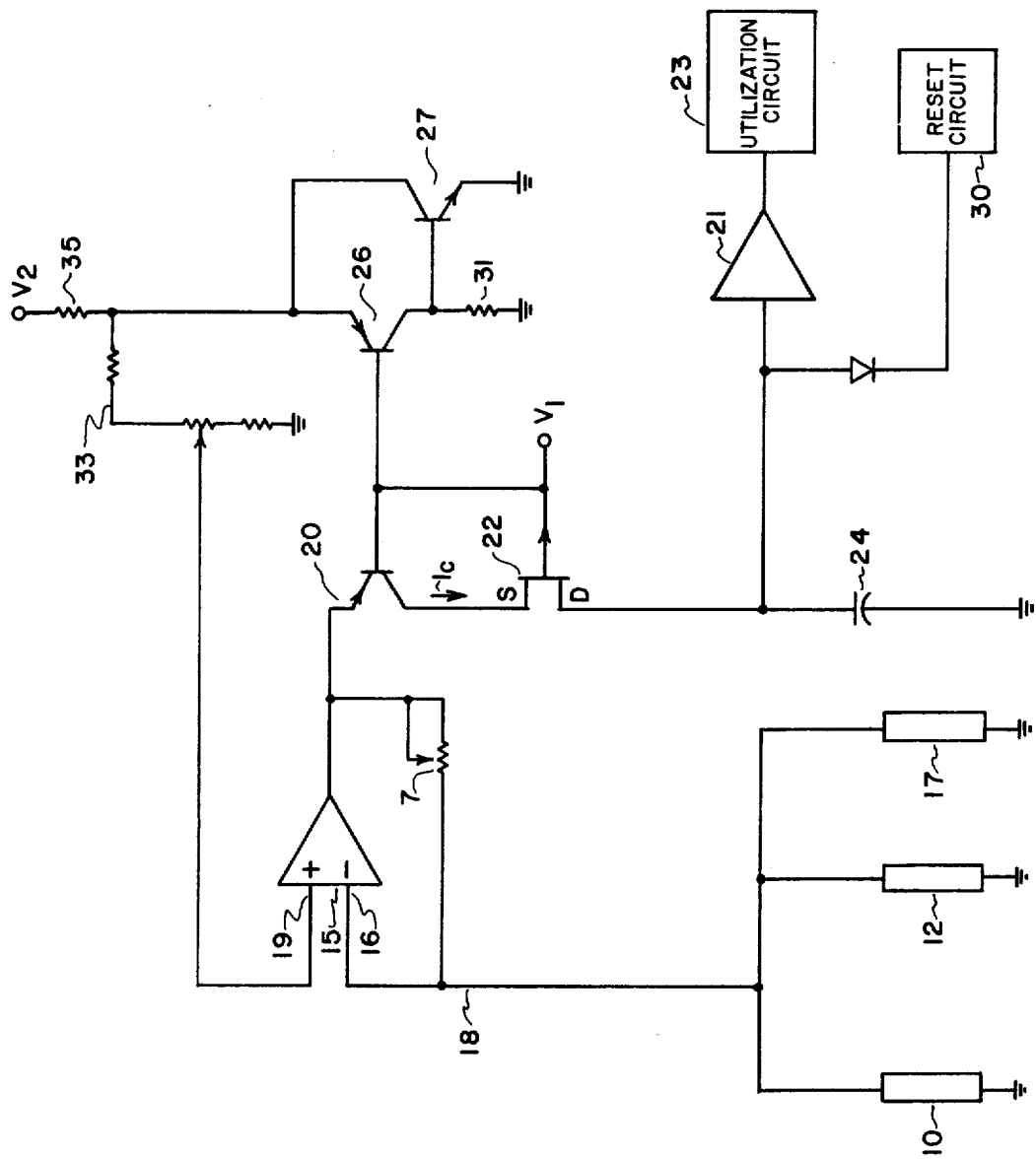
FIG. 1 shows a schematic diagram of the preferred embodiment.

FIG. 1 shows current sources 10, 12 and 17 which supply currents proportional to the logarithm of some parameters or control settings of a spectrum analyzer. For instance, the current produced by source 10 is proportional to $\log (BW_{IF})$, the current produced by source 12 is proportional to $-\log (SW)$, and the current produced by source 17 is proportional to $\log (BW_{vid})$. These currents are summed at an inverting input 16 of an operational amplifier 15, and a voltage proportional to the sum of these currents is developed across negative feedback resistor 7.

The output voltage of operational amplifier 15 is applied to the emitter-base junction of a transistor 20, and the base of that transistor is connected to a constant voltage $V_1$. Thus, the collector current ($I_c$) of transistor 20 is proportional to the anti-logarithm of its emitter-base voltage according to the well-known exponential semiconductor law: $I_c = K_2 e^{K_3 V_{BE}}$,
where $K_2$ and $K_3$ are device parameters that depend on temperature. This process of summing logarithms and forming the anti-logarithms means that the collector current of transistor 20, $I_c$, is proportional to:

$$\frac{BW_{IF} \times BW_{vid}}{1.5 \times SW}$$

The current $I_c$ is used to charge a capacitor 24 which is connected to transistor 20 by a field-effect transistor (FET) 22. The FET isolates transistor 20 from any loading effects of capacitor 24 since the voltage buildup on the capacitor changes the collectoremitter voltage on the transistor which in turn, affects somewhat the current output of the transistor. The FET has a negligible gate current, and therefore essentially all of $I_c$ reaches capacitor 24. This capacitor, in turn, is connected to utilization circuits 23 by a buffer amplifier 21. The buffer amplifier has a sufficiently high input impedance that the charge on capacitor 24 due to $I_c$ is not drained off by the utilization circuits. Typically, utilization circuits 23 will be horizontal deflection amplifier for a CRT and a voltage-tuned local oscillator in a spectrum analyzer. With a constant current $I_c$ from transistor 20, the voltage on capacitor 24 will increase linearly with time, and will thus provide a linear sweep signal to the utilization circuits. A reset circuit 30 such as those commonly used in spectrum analyzers and oscilloscopes is used to limit the voltage rise on capacitor 24 and reset it to zero when a predetermined maximum value is reached.

Figure 2:
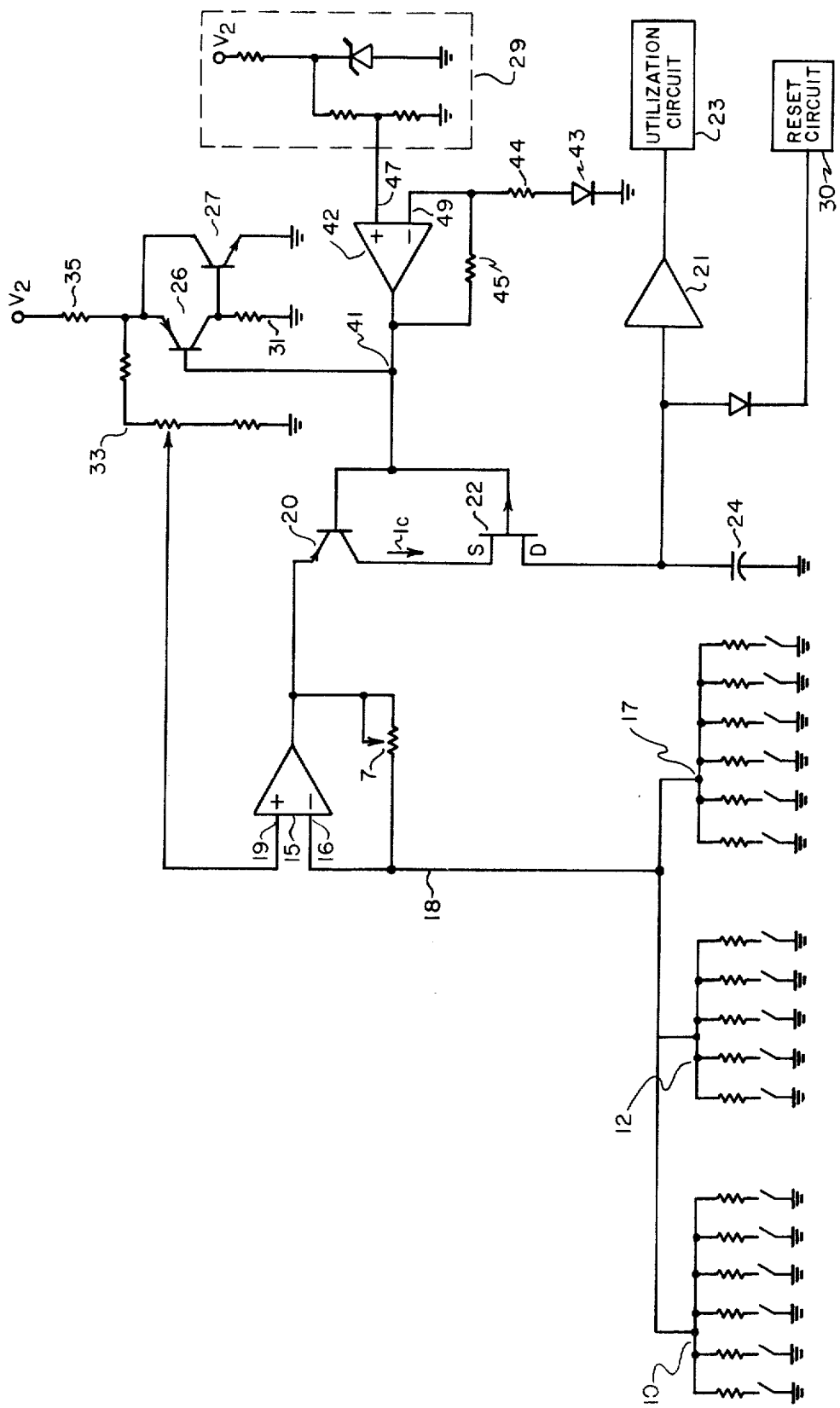
FIG. 2 shows a schematic diagram of the preferred embodiment with an additional temperature compensating circuit.

As shown in FIG. 2, current sources 10, 12 and 17 may each comprise a plurality of resistors that are selectively switched into the circuit between input 16 and ground. The values of the resistors are chosen so that a linear change in the value of a parameter selected by a sweep width or bandwidth switch will result in logarithmic change in current. Thus as the sweep width, for example, is increased by a factor of 10, the current proportional to it will decrease by one unit of current. It should also be noted here that both an IF bandwidth and a video bandwidth control are provided for. In some spectrum analyzers a relatively wide video bandwidth is provided (compared with the IF bandwidth) and only the IF bandwidth is variable. In such an analyzer the optimal sweep rate may be determined by the following equation:

$$SR \leq \frac{(BW_{IF})^2}{2.2\ SW}$$

Thus the increments of current representing IF bandwidth in such an analyzer would be twice the increment of current used for sweep width.

As shown in both FIGS. 1 and 2, operational amplifier 15 also has a non-inverting input 19. This input is used to introduce a voltage that varies with temperature to compensate for temperature variations experienced by transistor 20. A temperature compensating transistor 26 is thermally coupled to transistor 20 by mounting them to a good thermal conductor such as a block of aluminum or copper. The emitter of transistor 26 is connected to a voltage source $V_2$ through a resistor 35, as is a variable voltage divider 33. $V_2$ is typically several volts higher than $V_1$. The variable arm of the voltage divider is connected to non-inverting input 19.

As the temperature of transistor 20 increases, the temperature of transistor 26 will also increase, as will the current through these transistors. With a greater current flowing through transistor 26, the voltage drop across resistor 35 will increase, decreasing the voltage on non-inverting input 19. That decrease will result in a lower voltage on the emitter of transistor 20, lowering the current through the transistor. The variable arm on voltage divider 33 can be adjusted to compensate for d.c. voltage offsets between inputs 16 and 19 and differences in the $V_{BE}$ of transistors 20 and 26.

A change in the current flowing through a transistor can change its temperature, and therefore changes in the current flowing through compensating transistor 26 could deleteriously effect the compensation. A transistor 27 is provided to keep the current through transistor 26 relatively constant to minimize temperature changes due to changes in current through transistor 26. The base of transistor 27 is connected to a resistor 31 in series with the collector of transistor 26 to sense the current through that transistor, and the collector of transistor 27 is connected to the emitter of transistor 26 to provide the current stabilizing feedback signal.

An additional temperature compensation circuit may also be provided as shown in FIG. 2. As previously mentioned, $I_c$ is temperature dependent since, in the equation $$I_c = K_2 e^{K_3 V_{BE}}$$

$K_3$ is inversely proportional to temperature. Thus the current through transistor 20 will still be temperature dependent to a certain extent, even if the compensation scheme shown in FIG. 1 is used. This temperature variation can be compensated for by making voltage $V_1$ vary with temperature as $K_3$ varies. The voltage drop across a forward-biased diode made of the same material as transistors 20 and 26 and thermally coupled to them will vary in the same way as $V_{BE}$. Such a forward-biased diode 43 is connected to an inverting input 49 of an operational amplifier 42 through a summing resistor 44. The voltage across diode 43 is added to a regulated voltage from a power supply 29, connected to a noninverting input 47 of operational amplifier 42, to provide a temperature dependent voltage $V_1$, at terminal 41 that varies the same as $V_{BE}$, but in the opposite direction.

I claim:

1. A sweep generator circuit, adapted to respond to a plurality of input quantities, comprising:
   current source means for producing currents proportional to the logarithms of each of the input quantities;
   summation means connected to the current source means for producing a voltage proportional to the sum of the currents from the current source means;
   exponentiating means connected to the summation means for producing a current proportional to the anti-logarithm of the voltage produced by the summation means; and
   charge storage means connected to the exponentiating means for producing a sweep voltage in response to the current produced by the exponentiating means.

2. A sweep generator as in claim 1 wherein:

the summation means comprises a summing amplifier;

the charge storage means comprises a capacitor; and the exponentiating means comprises a voltage source and a first transistor having an emitter connected to the summing amplifier, a base connected to the voltage source, and a collector connected to the capacitor.

3. A sweep generator as in claim 2 including a first temperature compensating circuit connected to the first transistor to compensate for thermally induced changes in collector current of the first transistor.

4. A sweep generator as in claim 3 wherein the first temperature compensating circuit comprising:

a second transistor exposed to the same thermal environment as the first transistor and having a base connected to the base of the first transistor, an emitter connected to a source of current and a collector; and circuit means connected between the summing amplifier and the emitter of the second transistor for providing a signal to compensate for thermally induced changes in the collector current of the first transistor.

5. A sweep generator as in claim 4 wherein the voltage source includes a second temperature compensating circuit.

6. A sweep generator as in claim 5 wherein the second temperature compensating circuit comprises:

a forward-biased diode exposed to the same thermal environment as the first and second transistors;

a source of relative stable voltage; and summing circuit having inputs connected to the forwardbiased diode and the source of relatively stable voltage and an output connected to the bases of the first and second transistors for applying to those bases a voltage that varies with temperature to compensate for the base-emitter voltage variation of those transistors.

7. A sweep generator as in claim 2 including a buffer circuit connected between the first transistor and the capacitor.

8. A sweep generator circuit as in claim 2 wherein the input quantities are quantities representing the IF bandwidth, the video bandwidth, and the scan width of a spectrum analyzer having a plurality of switches for selecting said quantites, and the current source means comprises a plurality of resistors connected to each of the switches.

* * * * *